(12) United States Patent
Su et al.

(10) Patent No.: US 11,539,268 B2
(45) Date of Patent: Dec. 27, 2022

(54) MOTOR AND INDUSTRIAL ROBOT

(71) Applicant: ABB Schweiz AG, Baden (CH)

(72) Inventors: Yun Su, Shanghai (CN); Guangming Xie, Shanghai (CN); Fengqing Lin, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 41 days.

(21) Appl. No.: 17/191,941

(22) Filed: Mar. 4, 2021

(65) Prior Publication Data
US 2021/0296965 A1 Sep. 23, 2021

(30) Foreign Application Priority Data

Mar. 17, 2020 (CN) .......................... 202010188020.1

(51) Int. Cl.
H02K 9/193 (2006.01)
H02K 5/20 (2006.01)
(Continued)

(52) U.S. Cl.
CPC .............. *H02K 9/193* (2013.01); *B25J 9/126* (2013.01); *G01M 3/04* (2013.01); *H02K 5/1735* (2013.01);
(Continued)

(58) Field of Classification Search
CPC ........ H02K 25/124; H02K 11/20; H02K 9/12; H02K 9/00; G01M 3/04
(Continued)

(56) References Cited

U.S. PATENT DOCUMENTS 5,293,107 A * 3/1994 Akeel .................. B25J 19/0029
310/83

FOREIGN PATENT DOCUMENTS

CN 204290570 U 4/2015
CN 205945426 U 2/2017
(Continued)

OTHER PUBLICATIONS

Extended European Search Report for EP 211605043.3 dated Sep. 14, 2021.

*Primary Examiner* — Jose A Gonzalez Quinones
(74) *Attorney, Agent, or Firm* — Greenberg Traurig, LLP

(57) ABSTRACT

Embodiments of the present disclosure relate to a motor and an industrial robot. The motor comprises a main body, an inner end cover, an outer end cover, a first oil seal, a second oil seal and an oil leakage sensor. The main body comprises a rotor extending along an axial direction. The inner end cover is coupled to the main body and comprises a first hole for the rotor to pass through. The outer end cover is arranged outside the inner end cover along the axial direction and abuts against the inner end cover. The outer end cover comprises a second hole for the rotor to pass through, wherein a first oil seal is arranged adjacent to the second hole and a second oil seal is arranged inside the first oil seal and is adjacent to the second hole. A gap is provided between the first oil seal and the second oil seal along the axial direction. The oil leakage sensor is provided in a through hole penetrating the outer end cover along the axial direction and is configured to detect the amount of oil or grease flowing to the oil leakage sensor via the first oil seal. The motor according to the present disclosure is characterized in dual sealing and an automatic oil leakage detection, thereby improving the motor sealing reliability and the digitalization of the motor oil leakage detection.

14 Claims, 3 Drawing Sheets

(51) Int. Cl.
*B25J 9/12* (2006.01)
*G01M 3/04* (2006.01)
*H02K 5/173* (2006.01)
*H02K 7/08* (2006.01)

(52) U.S. Cl.
CPC ............ *H02K 5/203* (2021.01); *H02K 7/085* (2013.01); *F16C 2380/26* (2013.01)

(58) Field of Classification Search
USPC .......................................... 310/54, 68 B, 64
See application file for complete search history.

(56) References Cited

FOREIGN PATENT DOCUMENTS

| | | | | |
|---|---|---|---|---|
| CN | 206452224 U | 8/2017 | | |
| CN | 108429384 A | 8/2018 | | |
| CN | 210111746 U | 2/2020 | | |
| DE | 102014011228 A1 * | 2/2016 | ............... | H02K 5/10 |
| DE | 102014011228 A1 | 2/2016 | | |
| JP | 05196535 A * | 8/1993 | | |
| JP | 2019080467 A | 5/2019 | | |
| WO | 2019184357 A1 | 10/2019 | | |

* cited by examiner

MOTOR AND INDUSTRIAL ROBOT

FIELD

Embodiments of the present disclosure generally relate to a field of motors, and more particularly to a motor comprising an end cover of a separate type and a structure of dual oil seals.

BACKGROUND

Servo motors have a wide range of applications, for example, industrial robots, especially small and medium-sized AC servo motors. With the development of servo motor applications, small and medium-sized AC servo motors are required to have a high power density, a compact structure and a high integration, which determines that the motor must be designed in a lightweight and compact manner. In addition, since a motor has a high demand for seal reliability, how to monitor oil seal leakage while ensuring a high power density of the servo motor so as to prevent external oil or grease from entering the motor remains a challenge for the designers. Conventionally, the general servo motor design method cannot meet the above requirements of robotic servo motors.

SUMMARY

For example, in the existing Chinese patent application CN 206452224U, there is provided a front end cover for a dual oil seal motor having an oil storage tank, which includes a main body of the front end cover for the motor and an outer oil seal, as well as an inner oil seal and an oil storage tank. However, since the space within the front end cover is very limited, a mechanism for detecting oil leakage cannot be provided in this structure. Therefore, the use range of this motor is also greatly restricted.

Embodiments of the present disclosure provide a motor comprising an end cover of a separate type and a corresponding industrial robot, which intends to at least partially solve the above and/or other potential problems in the design of a motor.

In a first aspect, embodiments of the present disclosure relate to a motor. The motor comprises a main body comprising a rotor extending along an axial direction; an inner end cover coupled to the main body and comprising a first hole formed thereon for the rotor to pass through; an outer end cover arranged outside the inner end cover along the axial direction and abutting the inner end cover, the outer end cover comprising a second hole formed thereon and arranged in alignment with the first hole for the rotor to pass through, wherein a first oil seal is arranged adjacent to the second hole and a second oil seal is arranged inside the first oil seal along the axial direction, the second oil seal being adjacent to the second hole and configured to seal the second hole; and an oil leakage sensor provided in a through hole penetrating the outer end cover along the axial direction and configured to detect the amount of oil or grease flowing to the oil leakage sensor via the first oil seal.

According to embodiments of the present disclosure, the motor is structurally compact and the internal space thereof can be fully utilized to install an oil seal and an oil leakage sensor. In this way, an effective sealing of a motor can be ensured without being harmed by external oil or grease.

In some embodiments, a gap is provided between the first oil seal and the second oil seal along the axial direction.

In some embodiments, the motor further comprises a thermal conductive material arranged on one side of the outer end cover adjacent to the inner end cover and adapted to transfer heat between the inner end cover and the outer end cover.

In some embodiments, the motor further comprises a bearing chamber arranged on the inner end cover and adjacent to the rotor; a bearing arranged within the bearing chamber to support the rotor; and a platen arranged on one side of the bearing chamber adjacent to the outer end cover and fixed to the bearing chamber via a screw to limit a movement of the bearing in the axial direction.

In some embodiments, the bearing chamber further comprises a recess arranged outside the bearing chamber in a radial direction and adjacent to the platen and allowing adhesive to enter the bearing chamber and adhere to the bearing, so as to limit a movement of the bearing in the radial direction.

In some embodiments, the inner end cover comprises a first notch formed thereon, and the outer end cover has a second notch formed thereon and located adjacent to one side of the inner end cover, the first notch being in communication with the second notch to accommodate wiring of the oil leakage sensor.

In some embodiments, the thermal conductive material comprises a silicon-based material.

In some embodiments, the motor is a robotic servo motor.

In a second aspect, embodiments of the present disclosure relate to an industrial rotor. The industrial rotor comprises a motor according to the first aspect.

BRIEF DESCRIPTION OF THE DRAWINGS

Through the following detailed description with reference to the accompanying drawings, the above and other objectives, features, and advantages of embodiments of the present disclosure will become easier to understand. In the accompanying drawings, a plurality of embodiments of the present disclosure will be described in an exemplary and non-limiting manner, wherein.

DETAILED DESCRIPTION OF EMBODIMENTS

Figure 1:
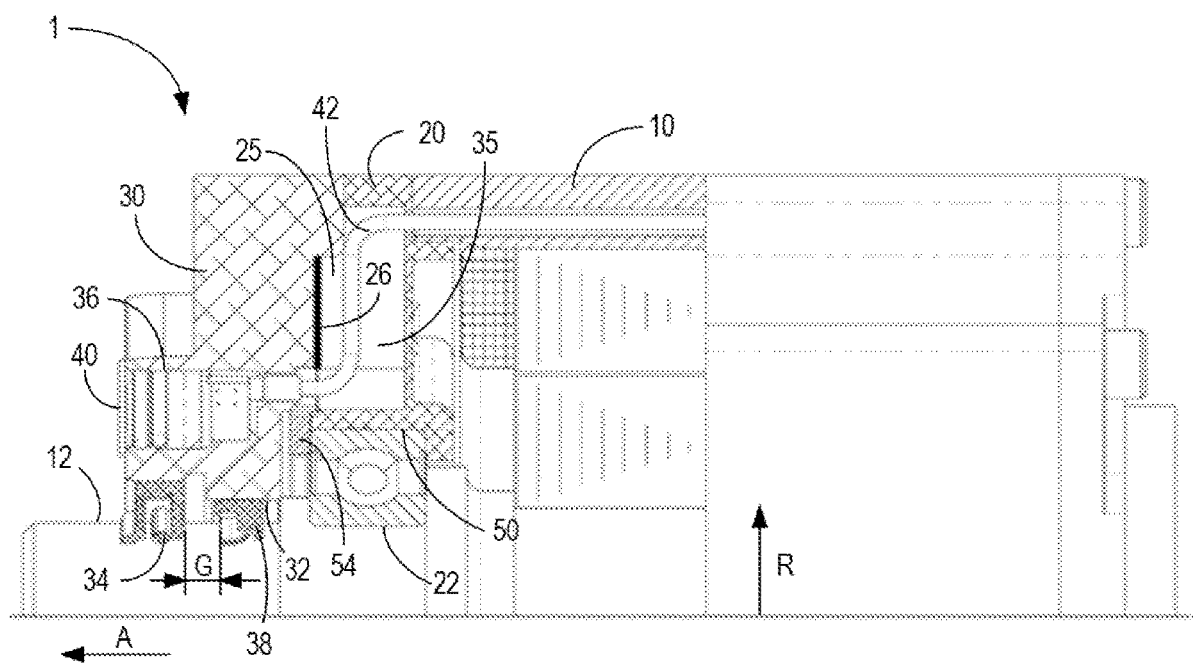
FIG. 1 is a schematic cross-section view illustrating an end cover of a separate type and a motor structure according to an embodiment of the present disclosure.

The principle of the present disclosure will now be described with reference to various embodiments in the drawings. It should be understood that these embodiments are only for the purpose of enabling those skilled in the art to better understand and thereby implement the present disclosure, and are not described for the purpose of placing any limitation on the scope of the present disclosure. It should be noted that similar or identical reference signs may be used in the drawings where feasible, and similar or identical reference signs may indicate similar or identical elements. Those skilled in the art will understand that alternative embodiments of the structures and methods described herein may be adopted without departing from the principles of the present disclosure described from the following description.

As mentioned above, in the existing motor design, a single oil seal cannot meet the high requirements for sealing reliability. Meanwhile, due to spatial constraints, detection of oil or grease leakage near the end cover cannot be performed.

To solve the above problem, the present disclosure provides a motor including an end cover of a separate type and a structure of dual oil seals.

Figure 2:
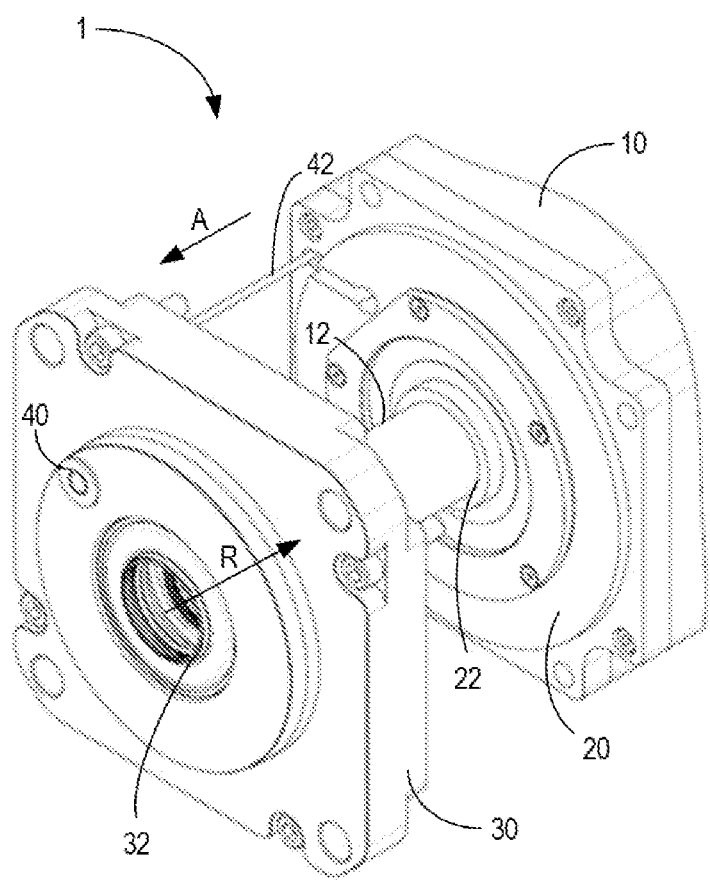
FIG. 2 is a schematic perspective view illustrating the end cover of a separate type according to an embodiment of the present disclosure.
Figure 3:
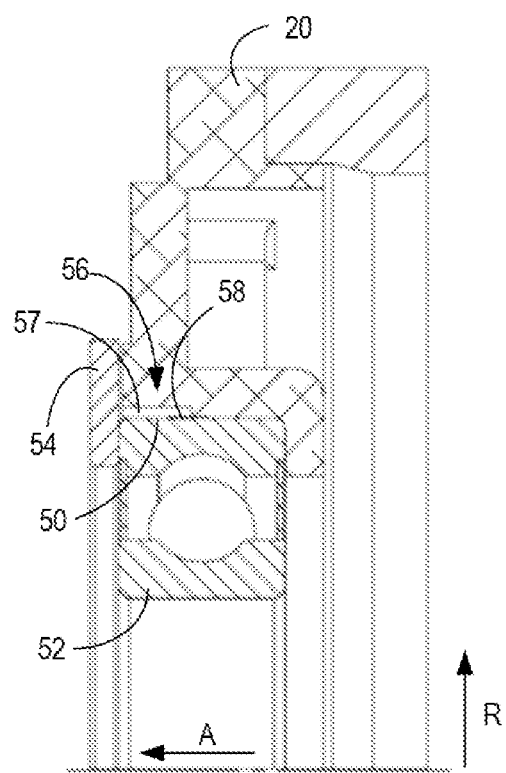
FIG. 3 is a schematic cross-section view illustrating a bearing fixing structure according to an embodiment of the present disclosure.

Some exemplary implementations are described according to embodiments of the present disclosure with reference to FIGS. 1 to 3.

Embodiments of the present disclosure relate to a motor 1 with an end cover of a separate type and dual oil seals. As shown in FIG. 1, the motor 1 generally comprises a main body 10, an inner end cover 20, an outer end cover 30, a first oil seal 34, a second oil seal 38 and an oil leakage sensor 40. The main body 10 comprises a rotor 12 extending in the axial direction A.

As shown, the inner end cover 20 is coupled to the main body 10, and the inner end cover 20 is provided with a first hole 22. The outer end cover 30 is provided outside of the inner end cover 20 and abuts the inner end cover 20. Similarly, a second hole 32 is also provided on the outer end cover 30, and the second hole 32 is aligned with the first hole 22. As shown in FIG. 2, the rotor 12 of the motor 1 passes through the first hole 22 and the second hole 32 in sequence to install the inner end cover 20 and the outer end cover 30 with the main body 10 of the motor 1. The first oil seal 34 is provided near the second hole 32, and the first oil seal 34 can prevent oil or grease from entering the main body 10 of the motor 1. As shown in FIG. 1, the motor 1 further comprises the second oil seal 38. The second oil seal 38 is disposed inside the first oil seal 34 in the axial direction A and is disposed adjacent to the second hole 32.

As shown in FIG. 1, the outer end cover 30 is provided with a through hole 36 extending substantially along the axial direction A and penetrating the outer end cover 30. An oil leakage sensor 40 is provided in the through hole 36 to detect the amount of oil or grease flowing from the first oil seal 34 to the oil leakage sensor 40.

According to an embodiment of the present disclosure, the first oil seal 34 can prevent liquid such as oil or grease from entering the inside of the motor 1 from the outside. In addition, since a two-stage end cover comprising the inner end cover 20 and the outer end cover 30 is provided, and a through hole 36 is provided at the outer end cover 30, the oil leakage sensor 40 can be properly arranged in the outer end cover 30 of the motor 1. In this way, the space of the motor 1 can be effectively utilized. Automatic and digital detection of oil leakage can be realized with the oil leakage sensor 40.

In some embodiments, when the first oil seal 34 fails, oil or grease may cross the first oil seal 34. Since the second oil seal 38 is arranged inside the first oil seal 34, the second oil seal 38 can block oil or grease from further entering the interior of the motor 1 while assisting in guiding the oil or grease into the oil leakage sensor 40. The second oil seal 38 can be used as a supplement to the first oil seal 34 to further improve the sealing effect of the motor 1. In some embodiments, the service life of the second oil seal 38 is higher than that of the first oil seal 34.

In an alternative embodiment, as shown in FIG. 1, a gap G is provided between the first oil seal 34 and the second oil seal 38 along the axial direction A, thereby forming an oil cavity. When the oil or grease entering the oil cavity between the first oil seal 34 and the second oil seal 38 accumulate to reach a certain amount, the oil leakage sensor 40 will sense the amount of oil or grease entering the oil cavity, thereby triggering an alarm and stopping the motor 1 for maintenance. The safe operation of the motor 1 can be ensured in this way.

In some embodiments, as shown in FIG. 1, the motor 1 may further comprise a thermal conductive material 26 arranged on one side of the outer end cover 30 adjacent to the inner end cover 20 and adapted for heat transfer between the inner end cover 20 and the outer end cover 30. In particular, when the motor 1 operates normally, the heat generated in the main body 10 can be effectively transferred to the outer end cover 30 via the thermal conductive material 26, so as to cool down the motor 1. In this way, the thermal conductive material 26 can make the heat transfer efficiency of the motor 1 comparable to that of the design of an end cover of a single piece, thereby avoiding the problem of poor heat dissipation that may be caused by the end cover of a separate type.

In some embodiments, as shown in FIG. 3, the motor 1 may further comprise a bearing chamber 50 arranged on the inner end cover 20 and adjacent to the rotor 12. A bearing 52 is provided within the bearing chamber 50 to support the rotor 12.

In some cases, if the bearing 52 is frequently subjected to the axial force in both directions, the bearing 52 may displace. This may not only cause vibrations in a device using the motor 1, but also may harm the person operating the device. Therefore, it is necessary to avoid the movement of the bearing 52 in the axial direction A. In an alternative embodiment, a platen 54 for fixation is provided on a side of the bearing chamber 50 adjacent to the outer end cover 30. The platen 54 may be fixed to the bearing chamber 50 with a screw such as a bolt. Compared with the traditional bearing retaining ring, such a method can achieve fixation with zero clearance, thereby effectively preventing the bearing 52 from displacing along the axial direction A. Therefore, the operation of the bearing 52 can be more reliable.

In addition, the design of the two-stage end cover makes installation and maintenance of the bearing 52 easier. This is because once the bearing 52 needs to be inspected or replaced, it is only necessary to remove the outer end cover 30 to expose the bearing 52 on the inner end cover 20 to the maintainers, which facilitates operation of maintainers and ensures the quality of maintenance.

In some embodiments, as shown in FIG. 3, the bearing chamber 50 may further comprise a recess 56 provided outside the bearing chamber 50 along the radial direction R. The recess 56 may be composed of a notch 57 on the inner wall of the bearing chamber 50 and a groove 58 in the circumferential direction of the bearing chamber 50. The adhesive used to bond an outer ring of the bearing 52 can be injected from the notch 57 and flow into the groove 58 and finally be bonded to the bearing 52, thereby restricting the movement of the bearing 52 in the radial direction R. In this way, it is possible to prevent an outer ring of the bearing 52 from being displaced, thereby ensuring the safe operation of the motor 1.

In some embodiments, the inner end cover 20 may comprise a first notch 25 formed on the inner end cover 20, and the outer end cover 30 has a second notch 35 formed on the outer end cover 30. As shown in FIG. 1, the second notch 35 is located at a side adjacent to the inner end cover 20 and is in communication with the first notch 25 to form a space. The wiring 42 for ensuring the normal operation of the oil leakage sensor 40 may be accommodated in this space. The wiring 42 may be a power line for supplying power to the oil leakage sensor 40, or a signal line for ensuring the normal operation of the oil leakage sensor 40. In this way, the internal space of the motor 1 can be effectively utilized without the need to change the structure of the motor 1.

In some embodiments, the thermal conductive material may comprise silicon-based materials. In alternative embodiments, the thermal conductive material may take the form of tape, thermal conductive filler, or the like. The specific form is not limited by embodiments of the present disclosure, as long as the specific form can achieve a thermal conductive effect.

In some embodiments, the motor 1 may be a robotic servo motor. It should be understood that the motor 1 may be other types of motors, and the specific form can be adjusted according to the needs of users, and is not limited by embodiments of the present invention.

The robotic servo motor according to the present disclosure has a compact structure and a reliable sealing effect. In addition, the modular design makes the motor assembly simple, which is useful for realizing mass automated production. In addition, only the front end cover of the motor 1 needs to be changed without adjusting the main body 10 of the motor 1, which is beneficial to increase the scope of application.

Embodiments of the present disclosure relate to an industrial robot. The industrial robot comprises the motor 1 discussed above.

The motor 1 according to embodiments of the present disclosure adopts a two-stage end cover, in which the one-stage end cover makes the first oil seal 34, the second oil seal 38 and the oil leakage sensor 40 form an integral assembly. This makes the assembly easier and reduces a probability of damage to the lip of the oil seal during the assembly. The arrangement of the two-stage oil seal can further improve the sealing effect of the motor 1, and once the oil seal fails, the oil leakage sensor 40 helps to issue an alarm to ensure the safe operation of the motor 1. This is advantageous in the design of small and medium-sized servo motors.

Although the claims in this application are drafted for specific combinations of features, it should be understood that the scope of the present disclosure also comprises any novel feature or any novel combination of features disclosed herein, explicitly or implicitly, or any generalization thereof, regardless of whether it involves the same solution in any of the claims currently claimed.

The invention claimed is:

1. A motor comprising:
a main body comprising a rotor extending along an axial direction;
an inner end cover coupled to the main body and comprising a first hole formed thereon for the rotor to pass through;
an outer end cover arranged outside the inner end cover along the axial direction and abutting the inner end cover, the outer end cover comprising a second hole formed thereon and arranged in alignment with the first hole for the rotor to pass through, wherein a first oil seal is arranged adjacent to the second hole and a second oil seal is arranged inside the first oil seal along the axial direction, the second oil seal being adjacent to the second hole and configured to seal the second hole;
an oil leakage sensor provided in a through hole penetrating the outer end cover along the axial direction and configured to detect an amount of oil or grease flowing to the oil leakage sensor via the first oil seal; and
a thermal conductive material arranged on one side of the outer end cover adjacent to the inner end cover and adapted to transfer heat between the inner end cover and the outer end cover.

2. The motor of claim 1, wherein a gap is provided between the first oil seal and the second oil seal along the axial direction.

3. The motor of claim 1, further comprising:
a bearing chamber arranged on the inner end cover and adjacent to the rotor;
a bearing arranged within the bearing chamber to support the rotor; and
a platen arranged on one side of the bearing chamber adjacent to the outer end cover and fixed to the bearing chamber via a screw to limit a movement of the bearing in the axial direction.

4. The motor of claim 3, the bearing chamber further comprising:
a recess arranged outside the bearing chamber in a radial direction and adjacent to the platen and allowing adhesive to enter the bearing chamber and adhere to the bearing, so as to limit a movement of the bearing in the radial direction.

5. The motor of claim 1, wherein the inner end cover comprises a first notch formed thereon, and the outer end cover has a second notch formed thereon and located adjacent to one side of the inner end cover, the first notch being in communication with the second notch to accommodate wiring of the oil leakage sensor.

6. The motor of claim 1, wherein the thermal conductive material comprises a silicon-based material.

7. The motor of claim 1, wherein the motor is a robotic servo motor.

8. An industrial robot comprising:
a motor, the motor comprising:
a main body comprising a rotor extending along an axial direction;
an inner end cover coupled to the main body and comprising a first hole formed thereon for the rotor to pass through;
an outer end cover arranged outside the inner end cover along the axial direction and abutting the inner end cover, the outer end cover comprising a second hole formed thereon and arranged in alignment with the first hole for the rotor to pass through, wherein a first oil seal is arranged adjacent to the second hole and a second oil seal is arranged inside the first oil seal along the axial direction, the second oil seal being adjacent to the second hole and configured to seal the second hole;
an oil leakage sensor provided in a through hole penetrating the outer end cover along the axial direction and configured to detect an amount of oil or grease flowing to the oil leakage sensor via the first oil seal; and
a thermal conductive material arranged on one side of the outer end cover adjacent to the inner end cover and adapted to transfer heat between the inner end cover and the outer end cover.

9. The industrial robot of claim 8, wherein a gap is provided between the first oil seal and the second oil seal along the axial direction.

10. The industrial robot of claim 8, further comprising:
a bearing chamber arranged on the inner end cover and adjacent to the rotor;
a bearing arranged within the bearing chamber to support the rotor; and a platen arranged on one side of the bearing chamber adjacent to the outer end cover and fixed to the bearing chamber via a screw to limit a movement of the bearing in the axial direction.

11. The industrial robot of claim 10, the bearing chamber further comprising a recess arranged outside the bearing chamber in a radial direction and adjacent to the platen and allowing adhesive to enter the bearing chamber and adhere to the bearing, so as to limit a movement of the bearing in the radial direction.

12. The industrial robot of claim 8, wherein the inner end cover comprises a first notch formed thereon, and the outer end cover has a second notch formed thereon and located adjacent to one side of the inner end cover, the first notch being in communication with the second notch to accommodate wiring of the oil leakage sensor.

13. The industrial robot of claim 8, wherein the thermal conductive material comprises a silicon-based material.

14. The industrial robot of claim 8, wherein the motor is a robotic servo motor.

\* \* \* \* \*